3,556,969
METHOD AND APPARATUS FOR OBTAINING
ELECTRODEPOSITED SHAPED ARTICLES
FROM FIBROUS PROTEIN FIBRILS
Jun Mizuguchi, Tokyo, and Sakushige Kinoshita, Kanagawa-ken, Japan, assignors of one-third to Chukichi Kinoshita, Minami-ku, Yokohama, Kanagawa-ken, Japan
Filed Sept. 22, 1967, Ser. No. 669,851
Claims priority, application Japan, June 15, 1967, 42/37,911
Int. Cl. B01k 5/02; C23b 13/00
U.S. Cl. 204—181                                   17 Claims

ABSTRACT OF THE DISCLOSURE

A direct current potential is established between electrodes inserted into an aqueous suspension of finely divided protein fibrils to deposit said fibrils on the surface of an electrode to obtain a shaped product. When the resulting product is tubular, it has utility, for example, as a casing for foodstuffs.

---

The present invention relates to a novel method and apparatus for obtaining shaped articles such as films, sheets, tubes, sacks, string and the like from fibrous protein fibrils.

It has been known in the art to employ natural products such as intestines, tendons or the like of animals in the production of such products as a casing for enveloping ham, sausage etc., surgical thread, gut for rackets, strings for musical instruments and so forth. In the field of casings and string articles of the above mentioned types, it is desirable that the manufactured products be similar in properties to the original protein starting materials, while at the same time enabling the products to be uniformly and economically mass produced. For the production of casings for foodstuffs, edible products should be employed. Surgical thread should be made of a material which is not injurious to the human body. Reconstituted natural fibrous protein materials meet the above requirements.

The usually employed natural fibrous protein starting materials comprise fibrils obtained by finely dividing skin, tendon, intestine or the like of animals by chemical or mechanical processes or by an enzymatic-chemical process. Heretofore, almost all practical methods for shaping such fibrils utilize the so-called extruder method. In the extruder method, hydrochloric acid or the like may be added to the fibrils which are swollen and hydrated to form a pasty mass. This mass is compressed and extruded through a circumferential slit or orifice in the form of a wet sticky tubular film. Subsequently, the film is passed through a coagulation bath to increase the strength of the film while being dehydrated to some extent, then through an alkaline bath to neutralize the acid content, and then the film is thoroughly rinsed with water thereby resulting in adequate coagulation and cross linking of the film. Thereafter, the wet film is dried to obtain the final product.

However, the prior art extruder method described above requires consideration of the following problems: corrosion of the extruder by the acidic paste; the necessity to remove rough fibrils which clog the extruder orifice; the removal of bubbles present in the acidic paste; fabrication of an orifice of narrow and uniform configuration; the necessity to change the extruder orifice or the whole extruder depending on the size of the desired product; orientation of the film during the extrusion which may result in subsequent splitting of the film; the necessity to strengthen the extruded wet tube or other shaped article sufficiently to withstand subsequent treatment; neutralization of the acidic contents of the shaped article; and the necessity for exhaustive water rinsing of the extruded product. Notwithstanding the above disadvantages, there is still a great demand for such articles as the so-called artificial casing (Kunstdarm), processed intestines and tendons (gut, string) and the like produced by the above method.

It is a primary object of this invention to provide an improved method and apparatus for obtaining shaped articles from fibrous protein fibrils. A further object of the invention is to provide an improved procedure for obtaining protein fibrils shaped in the form of casings, string, sacks and the like which articles have uniform thickness and are free of pin holes.

A further object of the invention is to provide novel shaped articles in which individual component protein fibrils are intertwined with each other.

Other objects and advantages of this invention will be apparent from the following description.

Fundamentally, the present invention comprises a procedure for electro-chemically obtaining a shaped article from fibrous protein fibrils contained in aqueous suspension by depositing the fibrils on at least one electrode. For the sake of convenience, the term "electro-deposition" is used to refer to the deposition or adherence of the fibrils to an electrode surface. This term is also employed for the purpose of distinguishing the principle of the invention from known processes employing electrodes such as electro-plating etc. In conventional electro-plating, the deposited substance, e.g., a metal, is strongly bonded or adhered to the surface of the electrode and cannot be readily peeled off. On the other hand, the electro-deposition of the present invention results in the deposited fibrils being loosely adhered to the electrode surface so that the shaped article may be readily peeled off the electrode surface. The present invention is more concerned with utilizing the electrode to shape the deposited material rather than with obtaining an adherent coating on the electrode. In addition, the invention does not aim at so called electrolysis for its object but rather is directed to carrying out the electro-deposition while suppressing unnecessary electrolysis of various electrolytic impurities which may be present in the aqueous suspension within the electro-deposition vessel.

The principal raw materials used in the practice of the invention are fibrous protein materials such as intestines, tendons, skin, or hypodermal tissue of animals. Other suitable raw materials include defurred and defatted raw hide, chrome-tanned hide from which the tanning agent has been removed and which has an appearance similar to that of raw hide.

The term "fibrous protein" refers to collagen contained in the above mentioned raw materials; fibroin in raw silk from silk worms; keratin in hair; fibrinogen in blood; myosin in muscles, and other proteins such as those contained in cuttlefish and devil fish. Observation of such proteins has demonstrated that they are in a fibrous form having a spiral structure. It will of course be appreciated that these proteins are not simple molecules having a constant composition and structure. There are many instances when the proteins coexist with mucoprotein or the like or denatured protein. Accordingly, the proteins used in this invention are not necessarily chemically pure substances.

The term "fibrils" designates fine fibers which are obtained by finely dividing the protein starting materials mechanically, chemically or enzymatic-chemically. This term has no strict definition since it encompasses such large fibers as those which may be observed by the naked eye, for example, up to 10 mm. in length, as well as small fibers which can be observed only under a microscope.

It is impossible to definitely determine the thickness of such fibrils in an aqueous suspension since the fibrils are swollen and hydrated to a considerable extent.

The raw protein materials, after the removal of dirt, fur, fat, tanning agent etc., are finely divided by a cutter, beater, chopper, kneader, stone mill and the like to form fibrils. Water is then added to the fibrils to prepare an aqueous suspension of hydrated fibrils. If the pH of the suspension is maintained lower than 6.0, most of the fibrils are deposited on a cathode surface in the subsequent electro-deposition step. On the other hand, if the pH is maintained higher than 9.0, the fibrils are deposited on an anode surface. In this way, it is possible to deposit fibrils on any electrode by regulating the pH. In general, it is more convenietn to deposit the fibrils on a cathode surface. When the fibrils are to be deposited on the cathode, an inorganic acid or a free organic acid is admixed with the fibrils to swell the fibrils and to regulate the pH of the suspension to lower than 6.0, preferably between 2.0 and 4.0. Suitable acids include hydrochloric acid, acetic acid, lactic acid and the like. When the fibrils are to be deposited on the anode, an alkaline agent such as potassium hydroxide, sodium hydroxide, sodium phosphate or the like is added to raise the pH of the suspension to higher than 9.0, preferably between 10.0 and 13.0. The resulting dilute aqueous suspension of hydrated fibrous protein fibrils has a white opaque appearance and a viscosity similar to that of dilute meal.

The shape of the electrode(s) upon which the fibrils are deposited plays an important role in determining the shape of the final product. To obtain a sack-like article, the electrode serving as the deposition base may have the same shape and size as that of the desired final product. For example, in the preparation of large size casing for foodstuffs, a cylindrical or square pillar electrode may be used as the deposition base and may be provided with an end portion corresponding to the closed end of the casing. Stainless steel tubing having a diameter of about 45 mm. and a length of about 200 mm. with a rounded end has been found suitable for use as a deposition base in the production of condoms. In the production of long continuous casings for use in enclosing Vienna sausage, salami and the like, the electrode may be a hollow cylinder having the same diameter as the diameter of the desired final product. The electrode is provided with an annular passage so that gas may be introduced into the interior of the wet tubular product to support the wet tubing which is preferably continuously withdrawn from the electrode by suitable wind-up means.

To obtain a string-shaped article, the deposition base is an electrode having a diameter far larger than the article's diameter, or the electrode may be a plate which is either planar or has an arcuate surface. When employing a cylindrical electrode for this purpose, gas may be exhausted from within the interior of the wet tubular product as it is being removed from the electrode so that the product which is initially tubular may be twisted and stretched while being removed from the electrode in order to form a wet solid strip or string. By applying suitable tension to the string, it is possible to orient the component fibrils in the direction of the stretching. When the electrode employed as the deposition base has a arcuate surface, the shaped article may have a corresponding curvature.

A suitable direct current source is utilized to carry out the invention and may produce either an even or a pulsating current. The voltage or potential between the electrodes may vary over a wide range, with higher applied potentials resulting in higher electro-deposition rates. However, with higher potentials, there arise problems due to possible current leakage, metal corrosion, risk of sparks etc. When employing lower voltages, the above problems are minimized but the production efficiency is lowered due to the lower electro-deposition rate. The thickness of the electro-deposited fibril layer increases with increasing voltages and time. Generally speaking, a potential between about 5 to about 1,000 volts is practical and a voltage between about 100–300 volts is usual.

The concentration of electrolyte impurities in the aqueous suspension is preferably kept low since when electrolytes are present in high concentration, this causes an excessive current flow and adversely effects the quantity and quality of the fibril product. It has been found that with low concentrations of electrolytes in the aqueous suspension, the thickness of the deposited fibril layers increases. However, there is little relationship between the concentration of the fibrils in the aqueous suspension and the thickness of the product. Even when utilizing a very dilute aqueous suspension of the fibrils which appears slightly cloudy, the fibrils can be deposited to form a layer in which the fibrils are intertwined with each other as may be observed by the human eye. A concentration of fibrils higher than about 3% is to be avoided because a thick suspension tends to strip off the electro-deposited layer. Accordingly, fibril concentrations between about 0.01 and 2.0 percent by weight are especially preferred.

The temperature of the aqueous suspension during the electro deposition is usually maintained below about 60° C. since above this temperature the fibrils are liable to be denatured resulting in a brittle final product unless the electro-deposition is carried out very quickly. At low temperature, the deposition rate is lower but the quality of the product is improved. The preferred temperatures are in the range from the freezing point of the aqueous suspension to about 25° C.

The electrodes are made of materials which are preferably substantially inert and insoluble during the reaction in the aqueous suspension. Suitable materials for use as the cathode include stainless steel, nickel, gold, silver, lead or other metal, alloys of such metals, noble metal plated on base metals, graphite, or electro-conductive powders such as graphite shaped with binders such as paraffins, synthetic resins or the like. Examples of suitable anode materials include platinum, lead dioxide and stainless steel.

In order to increase the tensile strength of the final product and to impart a fine texture to the product, the aqueous suspension may be partially hydrolyzed by heating or by action of a protein decomposing enzyme, acid or alkali, thereby increasing the amount of hydrophilic groups and strengthening the hydration ability of the fibrils. Alternatively, non-hydrolyzed fibrils may be mixed with hydrolyzed fibrils, the latter performing the role of a binding agent.

One particularly effective way of increasing the tensile strength and tear strength of the product is to add to the protein fibrils slightly larger fibers which preferably have an irregular surface due to action of a beater or the like, and to electro-deposit such larger fibers concurrently with the fibrils. Such additional, larger fibers may be silk floss, silk yarn, cellulose, cotton, staple fiber, polyvinyl chloride fiber, polyvinyl acetate fiber, polyvinylidene chloride fiber, polyamide fiber and other natural or synthetic fibrous materials. Larger fibers of animal tendons or skins which are fibrous protein materials are also useful for this purpose.

To increase the hot water resistance and tensile strength of the product, a coagulating agent such as formalin, acetaldehyde, crotonaldehyde, methyl-glyoxal, epichlorohydrin, epoxy oil, glycol-dialdehyde, acrolein, or the like is added to the aqueous suspension in a minor amount corresponding to its activity so that the coagulating agent is incorporated into the deposited fibril layer. The coagulating agent effects coagulation and cross-linking by heat during the subsequent drying step. Alternatively, for the same purpose, the wet shaped article may be contacted after its formation with a dilute aqueous solution containing one of the above mentioned coagulating agents or containing additionally alum, aluminum sulphate, or tannin by means of dipping, spraying or other conventional procedure. If the coagulating agent is vaporizable, its vapor may be contacted with the wet shaped product.

To impart flexibility to the product, an agent such as glycerine, ethylene glycol, propylene glycol, sorbitol or the like may be dissolved in the aqueous suspension in a minor amount so that such agent is incorporated into the shaped article. Alternatively, the shaped article may be contacted with a flexibility imparting agent by spraying, dipping or the like.

A surface agent which may be either cationic, anionic or nonionic may be added to the aqueous suspension in a minor amount in order to increase the ease of separation between the deposited article and the electrode, and in order to obtain a defoamed, fine textured, good quality product.

The prepared aqueous suspension may be easily defoamed by placing it under a reduced pressure before the deposition step. By using a defoamed suspension, no air bubbles are contained in the deposited fibrils, and a more homogenous product is obtained.

Figure 1:
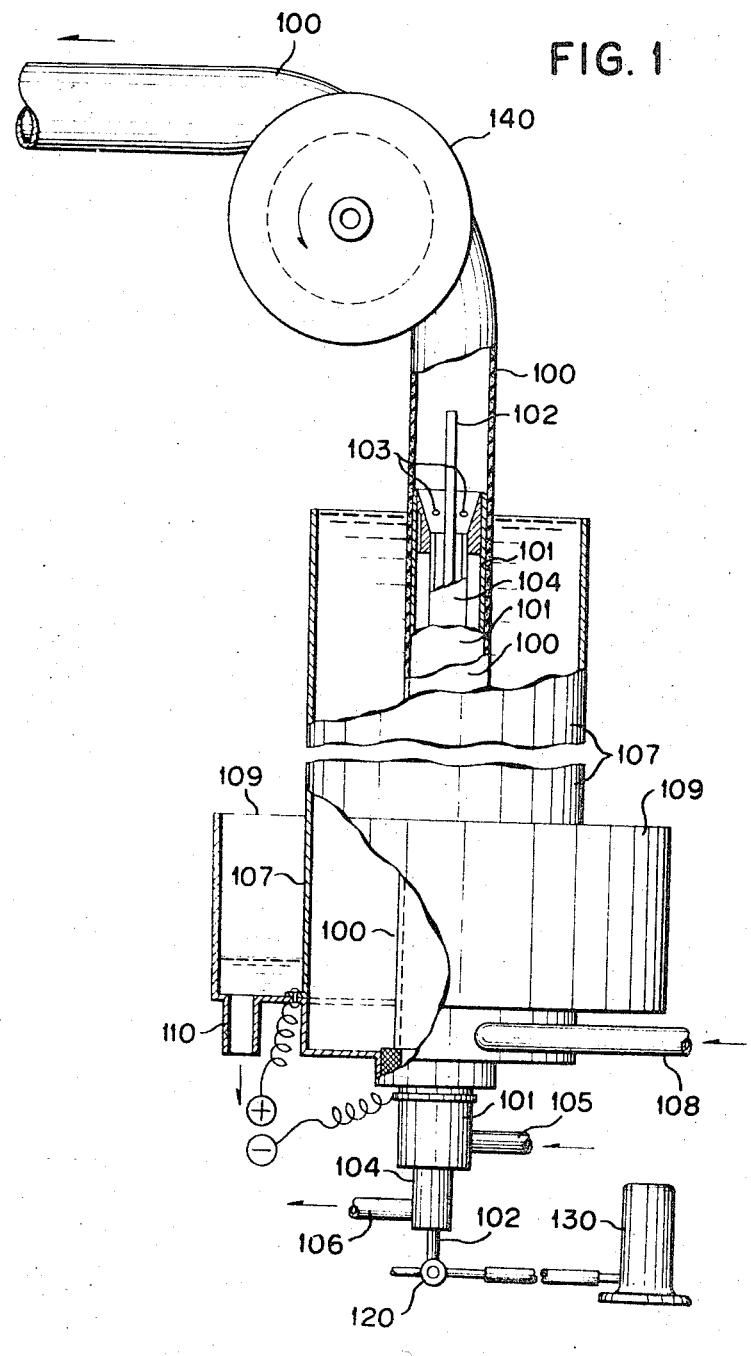
FIG. 1 is an elevational view partially in section of one embodiment of the present invention in which a tubular electro-deposited shaped article may be continuously formed and withdrawn from the electro-deposition vessel.

Referring now to the drawing and more particularly FIG. 1, reference numeral 100 designates a tubular electro-deposited article which is produced upon an annular cathode 101 which is supported within a vessel 107. A conduit 102 is positioned within the cathode 101 with its lower end connected to a three way stopcock 120 so that the interior of the shaped article 100 may either be vented to the atmosphere or may be supplied with a pressure fluid from a suitable pressure control device 130. Cooling and washing water is sprayed against the interior of the tubular product via an inlet pipe 105 and apertures 103 at the upper end of the cathode 101. The water is removed from the interior of the article through a drain pipe 104 which is disposed concentrically about the conduit 102, and which is connected at its lower end to a water outlet pipe 106.

The aqueous fibril suspension is introduced into the vessel 107 which also functions as the anode via an inlet conduit 108. The suspension may be cooled beforehand in order to prevent an excessive temperature rise in the vessel as a result of current flow during the electro-deposition. An annular tank 109 is disposed around the lower end of vessel 107 to receive liquid overflowing out of the open upper end of vessel 107. This overflow liquid is removed from tank 109 via a discharge conduit 110. The tank 109 is made of a suitable insulating material to prevent electrical leakage.

Figures 2A, 2B:
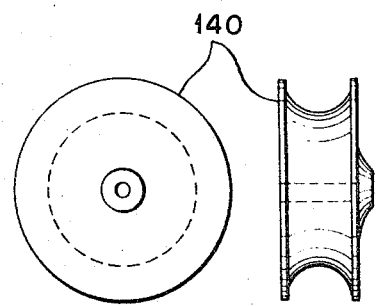
FIG. 2a is an elevational view of the wind up roller employed in the FIG. 1 embodiment.
FIG. 2b is a side view of the FIG. 2a device.

The tubular product 100 is continuously removed from vessel 107 by a wind-up roller 140 which is shown in detail in FIGS. 2a and 2b. The rate at which the product 100 is withdrawn is regulated in accordance with the rate of fibril deposition and the desired thickness of the final product. When a long tubular film is the desired final product, the pressure within the product 100 is controlled by introducing gas via pipe 102 to be about 1 atmosphere or higher, e.g., 6.0 mm. $H_2O$ gage in order to prevent adhesion of the inside wall of the wet tube, and to stabilize the wet tube.

At the start of operations, a gauze tube which is not shown in the drawings is wound loosely around the cathode 101 and passed over the wind-up device 140. After a small amount of the fibrils have been deposited upon the gauze, the gauze is drawn upwardly with the initial portion of the article 100 attached thereto. During this time it is desirable that a pressure slightly above atmosphere be maintained within the tube by way of the control device 130 and cock 120.

Figure 4:
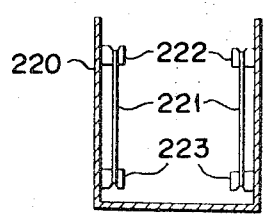
FIG. 4 is a transverse sectional view through the electro-deposition vessel of FIG. 3 showing the position of the anodes.
Figure 3:
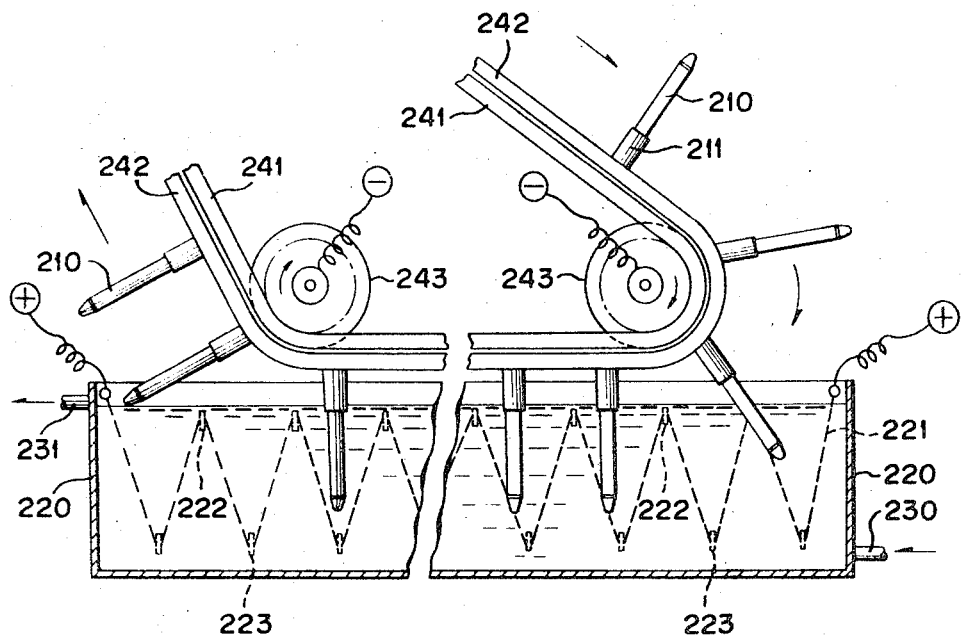
FIG. 3 is a partial elevational, part sectional view of another embodiment of the present invention for the production of sack shaped articles.

FIG. 3 illustrates another embodiment of the invention in which a plurality of sack like articles may be manufactured on rod shaped cathodes 210 which are connected to an endless guide rail 242 by way of insulating collars 211. The collars 211 prevent unwanted deposition of fibrils around the root of the cathodes. The cathodes are transported through the center of the electro-deposition vessel 220 by means of a drive chain 241 disposed in parallel with guide rail 242 and sprockets 243. Anodes 221 are arranged in a zig-zag line along each side of the vessel 220 and are carried by supports 222, 223 as is best seen in FIG. 4. The width of vessel 220 is such as to provide an optimum distance between the path of the cathodes and the anodes 221 which are disposed on either side of the cathodes.

The aqueous suspension of fibrils is introduced into the vessel 220 via inlet pipe 230. Liquid is withdrawn from the vessel via discharge pipe 231 which is positioned adjacent the top of vessel 220 so that the level of liquid within the vessel is slightly above the upper ends of the cathodes 210 during their passage through the tank between the sprockets 243. Chain 241 is driven in the direction of the arrows at a predetermined speed corresponding to the time required for the cathodes to be within the aqueous suspension in order to deposit the desired thickness of fibrils.

After the cathodes 210 have been passed through the aqueous suspension and the fibrils have been deposited thereon, the cathodes are removed from vessel 220 as shown at the left hand side of FIG. 3 and are passed through suitable treatment stages (not shown) in which the shaped articles are dried and may optionally be further treated to improve their physical properties by way of one of the agents referred to previously. The shaped articles are then removed from the cathodes which are then reused in vessel 220.

Figure 5:
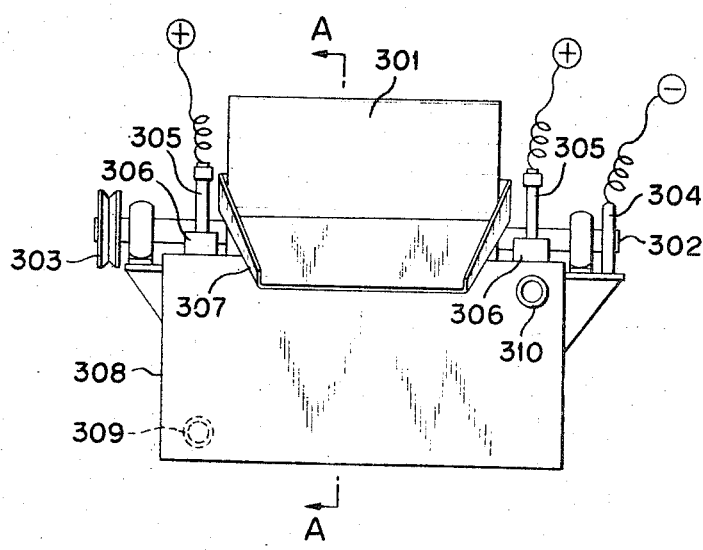
FIG. 5 is a front elevational view of another embodiment of the present invention utilizing a rotatable cylindrical electrode as the deposition base.

FIG. 5 illustrates another embodiment of the invention in which a large rotating drum 301 serves as the cathode. The drum is rotated by a shaft 302 which also serves as the electrical conductor to the cathode, with the shaft being driven via pulley 303 and a suitable belt which is not shown. A ring 304 at the other end of the shaft serves to transmit electric current to the shaft 302. The drum 301 is supported within an electro-deposition vessel 308 in which there are mounted four insoluble lead dioxide anodes 305, each of which is enclosed within a cylindrical diaphragm 306 and is positioned adjacent a corner of vessel 308. The aqueous suspension is introduced into vessel 308 through inlet 309, and liquid is removed through a discharge pipe 310 which is positioned at the upper end of the vessel 308. A scraper 307 removes deposited fibrils from the drum 301.

It has been found that this embodiment of the invention has particular utility in separating protein fibrils from electrolytes contained in aqueous suspensions. Thus, this embodiment is useful in effecting in purification of protein fibrils, which fibrils may be again subjected to electro-deposition in accordance with the teachings of the present invention to obtain shaped articles. It will also be appreciated that the embodiment of this invention may be utilized to obtain fibrils in the form of a sheet which may be utilized in that form as a final product for some applications.

Figure 6:
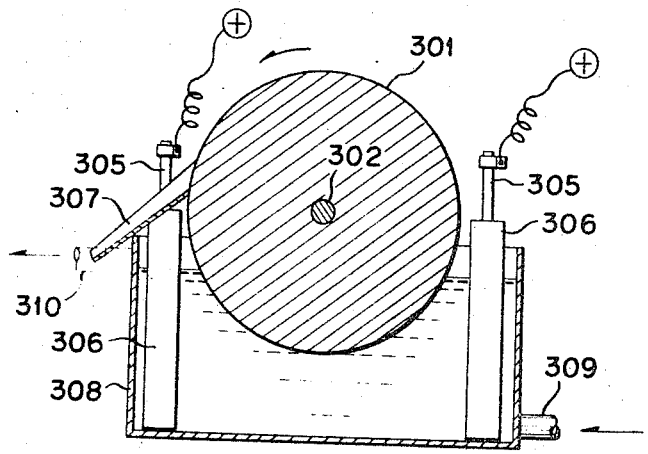
FIG. 6 is a vertical cross sectional view taken generally on the line A—A of FIG. 5.

The use of diaphragms such as those designated by reference numeral 306 in FIG. 6 to divide the electro-deposition vessel into cathode chambers and anode chambers is optional. When employing diaphragms, the suspension of the protein fibrils to be deposited is introduced into the chamber containing the electrode which is to be the deposition base, and the pH is maintained within the previously described ranges. An electrolyte is introduced into the other electrode chamber. For example, when a suspension having a pH lower than 6.0 is introduced into the cathode chamber(s), an aqueous solution of dilute hydrochloric acid, dilute sulphuric acid or the like is employed as the electrolyte in the anode chamber(s). Preferably the anode chamber solution does not contain cations other than hydrogen ions. Alternatively, if the anode is to be the deposition base, the aqueous suspension at a pH higher than 9.0 is introduced into the anode chamber, and an aqueous solution of potassium hydroxide or sodium hydroxide is used as the electrolyte in the solution in the cathode chamber. In this case, it is preferred that the solution within the cathode chamber does not contain anions other than hydroxyl ions.

The use of diaphragms have the advantages that no fibrils are deposited on the electrode which is not immersed wtihin the aqueous suspension so that there is little loss of material and there is less likelihood that denatured fibrils will be produced. Also, the regulation of the pH is easier since there is a slower rate of change of the pH in the chamber in which the shaped article is being produced. Furthermore, the risk of anode material from the anode contaminating the rest of the system is minimized. On the other hand, the use of diaphragms requires more complicated design of the electro-deposition vessel, entails additional labor and expense, and introduces the possibilities of problems due to breakage of the diaphragm or blockage of its pores. In view of the foregoing factors, it is preferred to use diaphragms only when an especially expensive good quality product is required. Otherwise, the purposes of the invention may be sufficiently attained without the use of diaphragms.

Suitable diaphragm materials include unglazed porcelain, alundum, synthetic resins having the necessary properties, or cloth made of natural fibers such as cotton, silk or the like or synthetic fibers and having a suitable mesh.

When utilizing apparatus of the previously described embodiments of the invention, shaped articles of any desired thickness may be readily obtained by adjusting the voltage and electro-deposition time without requiring complex adjustment of the entire apparatus or adjustment of an extruder orifice as in the prior art extruder method. Thin films, for example, less than 0.01 mm. thick and fine strings having diameters of less than about 0.01 mm. which cannot be produced by known extruder methods can be readily obtained by suitable adjustment of the voltage and time of the electro-deposition of the present invention.

It is a significant feature of the invention that the fibrils are deposited in a random manner so that a non-oriented film or other product may be obtained. In addition, if a subsequent stretching treatment is applied to the shaped article, it is possible to obtain an article having an appropriate degree of orientation. On the other hand, in the prior art extruder methods, films were initially obtained with the fibrils primarily oriented in the direction of the extrusion and stretching.

Figure 7:
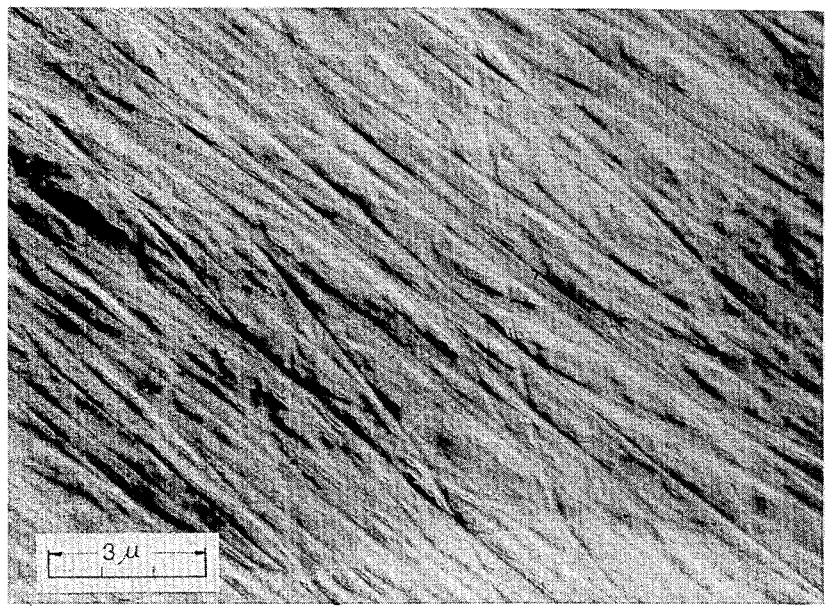
FIG. 7 is an electron microscopic photograph magnified 9,000 times of the surface of a fibrous protein fibril film made according to the prior art extruder method.
Figure 8:
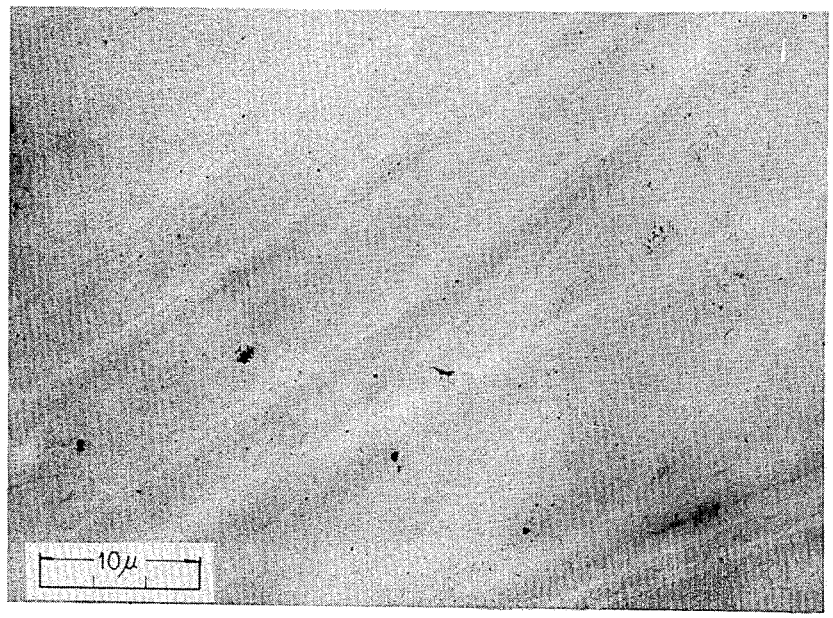
FIG. 8 is a similar photograph (3,000 magnifications) of another prior art product.
Figure 9:
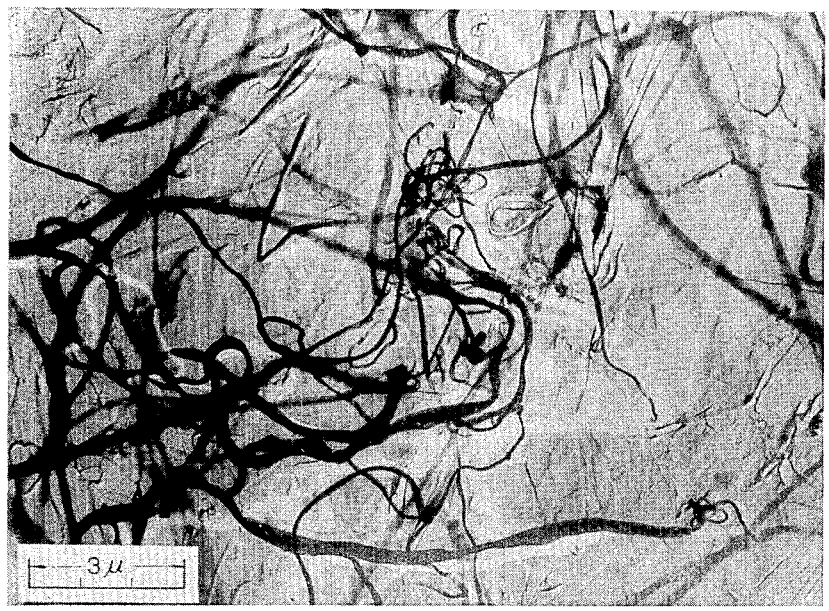
FIG. 9 is a similar photograph magnified 9,000 times of a film obtained from protein fibrils in accordance with the teachings of the present invention.

The above noted differences between the final products of this invention and those of the prior art are apparent from the electron-microscopic photographs of FIGS. 7, 8 and 9.

FIGS. 7 and 8 are electron microscopic photographs of surfaces of two films obtained from protein fibrils according to prior art extruder methods magnified 9,000 times and 3,000 times, respectively, by the so-called replica method. These photographs clearly show that the fibrils are arranged in a given direction in both of the films.

FIG. 9, which is an electron microscopic photograph of the surface of a film prepared according to the present electro-deposition method, magnified 9,000 times, clearly shows that the fibrils are randomly arranged. In general, the light dark portions represent fibrils deposited relatively early during the process, and the heavy dark portions represent fibrils deposited later in the process. For a given fibril, those portions near the surface of the film are represented as heavy dark areas, and those portions further from the surface of the film, for example, extending below other fibrils, are represented by lighter areas. Thus, this photograph illustrates that individual fibrils are intertwined or tangled with each other.

According to the present invention, it is unnecessary to provide a step to eliminate acidic contents after shaping the paste as in the known extruder methods. The layer of fibrous protein fibrils deposited on the electrode surface forms a semipermeable membrane and the vicinity of the electrode is neutralized resulting from the difference of transport numbers between anions and cations and their discharges. As a result, the layer is naturally deacidified or dealkalininzed to be almost neutral during the course of the electro-deposition. In addition, the fibrils release their hydrated water resulting in a tough layer having a fine structure.

The present invention results in products in which pin holes are substantially eliminated since when large or small pin holes occur in the electro-deposited film, the electrical resistance in the regions of the pin holes is less than that of the other portions which are covered by the deposited fibrils so that there is increased current flow through the pin hole portions resulting in an essentially automatic covering up and closing of the pin holes so that these portions become substantially identical in thickness and quality with the remainder of the deposited film. This is a further advantage over the extruder method in which it is impossible to obviate pin holes in a similar fashion.

The products of the invention show increased mechanical strength and stronger hydrophilic properties than corresponding products of the extruder method. Therefore, the products of the invention retain their shape even when placed in water immediately after formation. These improved properties may be due to the fact that the fibrils are intertwined with each other and the fact that the shaped particle is electro-chemically neutralized.

The invention will be further described by way of the following examples:

EXAMPLE I

A defatted and defurred swine hide was chopped up by a food cutter, and then placed into a beater with the addition of water to be further finely divided. The mass was then compressed in a cloth bag to remove water soluble material. The remaining mass was taken out of the bag, placed into a kneader, diluted to a concentration of about 5% by adding water, and the pH was adjusted to 3.0 by drop-wise addition of dilute hydrochloric acid. The mass became swollen and hydrated while being finely divided for two hours.

The thus obtained translucent jelly like mass was placed in a kneader, and an aqueous suspension containing protein fibrils in a concentration of 1% on a dry basis was prepared. 0.01% of formalin and 0.5% of glycerine were added to the fibrils. This suspension was treated employing an apparatus substantially as shown in FIGS. 1 and 2 in which the electro-deposition vessel and anode was a stainless steel cylinder of 10 centimeters inner diameter and 20 centimeters high. The cathode was a stainless steel pipe of 20 mm. outer diameter and its length within the electro-deposition vessel was about 20 centimeters. A slender copper tube of 5 mm. outer diameter was disposed within the cathode. Before starting the electro-deposition, the cathode was loosely covered with a cylindrical gauze which had its upper end connected to the wind-up roller 140. The fibrils were now electro-deposited through the mesh of the gauze onto the cathode and were intertwined with each other employing a potential of 100 volts, current of 3.5 amps, and an average current density for the cathode surface of 3 amps/dn.$^2$. The temperature in the electro-deposition vessel was maintained at 20° C. by circulating an aqueous suspension which was preliminarily cooled.

The product was an endless tube which was withdrawn at a rate of 1 m./min., and dried to a milk colored casing having a thickness of about 0.03 mm. The casing was not deteriorated or discolored and had sufficient strength for practical casings, even when dipped in water at 80° C. for 30 minutes or longer.

Another tubular electro-deposition product for use as a casing was made according to the above procedure except that no formalin or glycerine were used. This casing also had no tendency to be broken down or dispersed, even when a sample of about 5 meters length was placed into water immediately after coming out of the electro-deposition vessel. Further, this tubular product was closed at one end and air was blown into the tube from the other end to maintain an inside pressure higher than 1 atmosphere by 12 mm. H$_2$O to make the tube round. When this tube was held horizontally in air by supporting both ends, it was suspended in catenary and retained its round configuration without breaking or leakage. This demonstrated that the product has high strength and was free of pin holes.

EXAMPLE II

A defurred ox hide was cut into pieces 3 centimeters square, and further divided employing a first chopper provided with a perforated plate having holes of 10 mm. in diameter, a second chopper in which the plate holes were 5 mm., and a third chopper in which the plate holes were 1.5 mm. in diameter. The finely divided hide was made into an aqueous suspension having a solids concentration of 5%, which suspension was added to a kneader and kneaded while adding dilute hydrochloric acid to adjust the pH at 3.0 in order to swell the fibrils. At the same time, 0.5% of glycerine was added. After about 5 hours of kneading, the mass was allowed to stand for 24 hours at 20° C. to complete the swelling. The resulting mass was diluted with water to a solid concentration of 0.5% using a mixer. At this time glyoxal was added in the amount of 0.05 percent by weight. The mixer had 3 fluid pipes, the first of which was an inlet for the fluid mass of 5% concentration, the second was an outlet for the diluted aqueous suspension having a concentration of 0.5% hide solids, and the third was an inlet for electro-deposition residual liquid. The dilute aqueous suspension was then passed through a defoamer to remove air bubbles, and the defoamed liquid was introduced into an electro-deposition vessel. Electro-deposition was conducted employing an apparatus similar to that used in Example I, a direct current potential of 100 volts, an initial current of 7 amps which was reduced down to 1 amp after about 20 seconds, and then the product wind-up apparatus was started. The fibril tubular product was distended by applying gas under pressure within the tube, and the tube was then passed through a dryer in which air was circulated at a temperature of about 60° C., and a humidity of 15, for 10 minutes, and then removed by the wind-up apparatus. The tube was then dried in a drying room at 80° C. for 10 hours to complete the heat curing to obtain a final product having a thickness of 0.03 mm.

The electro-deposition liquid which overflowed the top of the deposition vessel was passed to a cooler and cooled to 10–18° C. to prevent elevation of the temperature of the aqueous suspension caused by heat generated by the current flow. The cooled liquid was then returned to the mixer mentioned above for reuse. The liquid used in one cycle was 50 l. and its flow rate was about 300 l./hr. In addition, fresh fibrils at a solids concentration of 5% was added to the mixture at a rate of about 40 cc./min.

EXAMPLE III

In a similar manner as described in Example II, a swollen mass of fibrils was prepared from a swine hide, and 0.5% of a surface active agent was added. Electro-deposition was conducted at a potential of 200 volts and a current of 5 amps, with the withdrawal of the product being at a rate of 2 m./min. The tubular product was passed through an aqueous solution containing 1% of formalin for 5 minutes. After that, the tube was placed in an aqueous solution containing 5% of alum for 5 minutes, and then rinsed with water for 10 minutes to remove excess alum, resulting in a swinehide casing having substantially the same strength as ox hide casing. Subsequently, the casing was placed in an aqueous solution containing 6% of glycerine for about 5 minutes, and then dried to obtain the final product.

EXAMPLE IV

A defatted ox tendon was treated similarly to the procedure described in Example I to prepare an aqueous suspension containing protein fibrils in the amount of 0.35% on a dry basis.

A glass cylinder of 15 centimeters outside diameter and 20 centimeters height enclosed at one end was used as an electro-deposition vessel. A stainless steel drawn pipe of 4 centimeters outside diameter and 15 centimeters in length and having a rounded end was employed as a cathode. A helical platinum wire of 0.5 mm. in diameter was placed around the cathode at a distance of about 3 centimeters to constitute the anode. The above described suspension was charged into the vessel up to a level of 2 centimeters above the top of the cathode, and a direct current potential of 120 volts was applied. The indicated current was 2.3 amps in the initial period, and 1 amp at steady state conditions during the final period. The temperature was elevated from 15° C. to 20° C.

The resulting sack shaped electro-deposition product, without being removed from the cathode, was immersed in an aqueous solution containing 0.1% glyoxal for 10 minutes. The product was air dried and then heated at 80° C. for 10 minutes to complete the heat curing and cross linking reaction. The product was then immersed in an aqueous solution containing 5% of sorbitol for 1 minute, again air dried and then stripped from the cathode base to obtain a sack like product useful as a condom and having a thickness of 0.04 mm. with satisfactory flexibility and strength.

EXAMPLE V

A chrome tanned waste hide was cleaned by removal of dirt and fur, rinsed with water, and then immersed in a substantially saturated lime water bath for one day at room temperature. The solids were centrifugally separated from the liquid, rinsed with water, and immersed in a 2% hydrochloric acid solution at room temperature for one half day to neutralize the lime content and to solubilize the chrome contents to make them effuse. The lime water and hydrochloric acid treatments were repeated alternately until the blue color peculiar to chrome disappeared. The resulting dechromed and water rinsed material was similar to raw hide, and was then passed through a food cutter and diluted with water. In order to remove electrolytes such as calcium chloride from the above treated material, it was refined by a preliminary electro-deposition treatment employing apparatus substantialy as shown in FIGS. 5 and 6. A stainless steel rotary drum of 30 centimeters diameter and 30 centimeters width was employed as a cathode and was mounted in an electro-deposition vessel made of plastic, and was provided with a scraper. Four lead dioxide anodes of about 6 centimeters in diameter and 35 centimeters in length were inserted into the vessel. The above described aqueous suspension of fibrous protein material was introduced into the vessel beneath the level of the rotary shaft of the drum. When a direct current potential of 80 volts was applied, and the drum was rotated at 2 r.p.m., the fibrous protein material was electro-deposited on the drum with an apparent film thickness of about 4 mm. The electro-deposited material was continuously scraped off by the scraper. In this way, there was obtained a pasty mass of fibrous protein fibrils having a water content of about 95%, which material was relatively free of electrolytes.

Ten kilograms of the pasty mass were mixed with 100 ml. of 5% proteolytic enzyme commercially available under the name of Proctase, and were left to stand over night at 25° C. The resulting mixture was blended with about 20 kilograms of the above described mass, and was placed into a kneader in which hydrochloric acid and water were gradually added to make a pulp liquid having a pH of about 3 and a fibrils concentration of 0.8% on a dry basis. A stainless steel tube of 10 mm. in diameter and 25 cm. in length was used as an electro-deposition vessel in which there was inserted a stainless steel tube of 5 mm. in diameter and which was sealed to the bottom of the outer tube for use in substitution for the cathode of Example I. The above described pulp liquid was fed into the lower portion of the vessel and was made to overflow from the top while applying a direct current of 3 amps and a potential of 150 volts. The resulting product was drawn up utilizing a cylindrical gauze as described in Example I and a withdrawal speed of 2 m./min. The resulting tubular film was taken up with appropriate twisting, and gas was withdrawn from the inside of the tubular film through the inner pipe mounted in the cathode to produce a wet string shaped product which was given orientation by stretching and was then passed through a formalin vapor chamber to be coagulated and strengthened. After that, the product was dried and passed through a die or polished to be made into surgical thread or tennis racket gut having appropriate orientation.

EXAMPLE VI

A sack shaped film was obtained in a similar manner to that described in Example IV but using an aqueous suspension of fibrils having a pH of 3.4, a viscosity of 0.75 poise, a fibrils concentration of 0.3% and using a diaphragm comprising a bottomed unglazed porcelain cylinder of about 25 mm. outer diameter and about 150 mm. in height. A lead dioxide anode of about 15 mm. outer diameter and about 200 mm. length was inserted into the diaphragm. The cathode was a stainless steel closed bottom cylinder of 36 mm. outer diameter and 100 mm. in length. In a beaker of about 100 mm. in diameter, one cathode was suspended with its bottom downward, and the unglazed porcelain cylinder was spaced near the cathode. The above described suspension was placed into the beaker externally of the porcelain cylinder into which there was introduced dilute hydrochloric acid as an anode liquid at a pH of 2.2. By applying a direct current potential of 100 volts for 30 seconds, and then exchanging the cathode for a new one, 15 sack shaped films were obtained. An initial current of about 1.3 amps and a final current of about 0.5 amp were observed for each cycle. The pH of the anode liquid was 2.2 initially and was reduced to 1.8 at the end of the final cycle. The pH of the cathode was reduced from 3.4 in the initial cycle to 3.0 in the final cycle. Each of the 15 products had a thickness of about 0.02 mm.

EXAMPLE VII

An aqueous suspension having a fibrils concentration of 0.5% was prepared as described in Example IV but using potassium hydroxide to regulate the pH to 11.0. A stainless steel closed bottom cylinder of 100 mm. diameter and 80 mm. in height was employed as a cathode, and a stainless steel tube of 19 mm. diameter and 70 mm. length was employed as a cathode. A direct current potential of 100 volts was applied between the electrodes resulting in an initial current of 1.4 amps which settled down to a constant value of about 0.7 amps as the electro-deposition proceeded. Protein fibrils were deposited and intertwined with each other on the anode to form a film. At the same time, a small quantity of film was also electro-deposited on the cathode.

In view of the foregoing description, it is apparent that the present invention is susceptible of many changes and modifications. Accordingly, it is intended to encompass all such changes and modifications as fall within the scope and spirit of the appended claims.

We claim:

1. A method for producing a shaped article from protein fibrils, which comprises preparing an aqueous suspension containing finely divided protein fibrils, introducing said aqueous suspension into an electro-deposition vessel provided with electrodes comprising at least one cathode and at least one anode, and applying a direct current potential between the cathode and anode to deposit said fibrils on the surface of at least one predetermined electrode in order to form a shaped article, removing said shaped article from said vessel, and recovering the resulting product.

2. A method according to claim 1, further comprising maintaining the temperature of said aqueous suspension within said vessel at less than about 60° C.

3. A method according to claim 1, wherein said aqueous suspension contains the protein fibrils in a concentration of less than 3% by weight on a dry basis.

4. A method according to claim 1, further comprising regulating the pH of said aqueous suspension in said vessel to a maximum of about 6.0 in order to deposit said fibrils on the surface of the cathode.

5. A method according to claim 1, further comprising regulating the pH of said aqueous suspension in said vessel to a minimum of about 9.0 in order to deposit said fibrils on the surface of the anode.

6. A method according to claim 1, wherein said vessel is provided with diaphragm means separating each cathode from each anode.

7. A method according to claim 1, further comprising adding a coagulating agent to said aqueous suspension in order to impart hot water resistance to the electro-deposited shaped article.

8. A method according to claim 1, further comprising adding a flexibility imparting agent to said aqueous suspension in order to impart flexibility to the electro-deposited shaped article.

9. A method according to claim 1, further comprising adding a surface active agent to said aqueous suspension.

10. A method according to claim 1, further comprising defoaming said aqueous suspension under reduced pressure prior to the application of the direct current potential.

11. A method according to claim 1, further comprising introducing additional aqueous suspension into said vessel during the application of the direct current potential.

12. A method according to claim 1, further comprising treating the article with a coagulating agent to impart hot water resistance thereto after removal from said vessel.

13. A method according to claim 1, further comprising treating said shaped article with a flexibility imparting agent.

14. A method according to claim 1, further comprising drying the removed shaped article after removal from said vessel.

15. A method according to claim 1, further comprising removing the shaped article from the said vessel substantially continuously as it is formed.

16. A method according to claim 1, further comprising preparing said aqueous suspension by introducing a crude aqueous suspension containing impurities in addition to fibrous protein fibrils into an electro-deposition vessel provided with at least one cathode and at least one anode, passing a direct current potential between the cathode and anode to selectively deposit said fibrils on the surface of at least one of said cathode and anode, removing the deposited fibrils, and utilizing said fibrils to prepare the aqueous suspension of claim 1.

17. A shaped article comprising intertwined protein fibrils prepared according to the method of claim 1.

References Cited

UNITED STATES PATENTS

| | | | |
|---|---|---|---|
| 670,350 | 3/1901 | Schwerin | 204—180 |
| 892,188 | 6/1908 | Schwerin | 204—180 |
| 894,070 | 7/1908 | Schwerin | 204—180 |
| 1,589,327 | 6/1926 | Eberlin et al. | 204—181 |
| 2,900,320 | 8/1959 | Metcalfe et al. | 204—300 |
| 3,445,361 | 5/1969 | Sicka et al. | 204—181 |

JOHN H. MACK, Primary Examiner

A. C. PRESCOTT, Assistant Examiner

U.S. Cl. X.R.

204—180, 299, 300